July 22, 1958 — W. R. POLANIN — 2,844,222
RAILWAY BRAKE
Filed Oct. 6, 1954 — 2 Sheets-Sheet 1
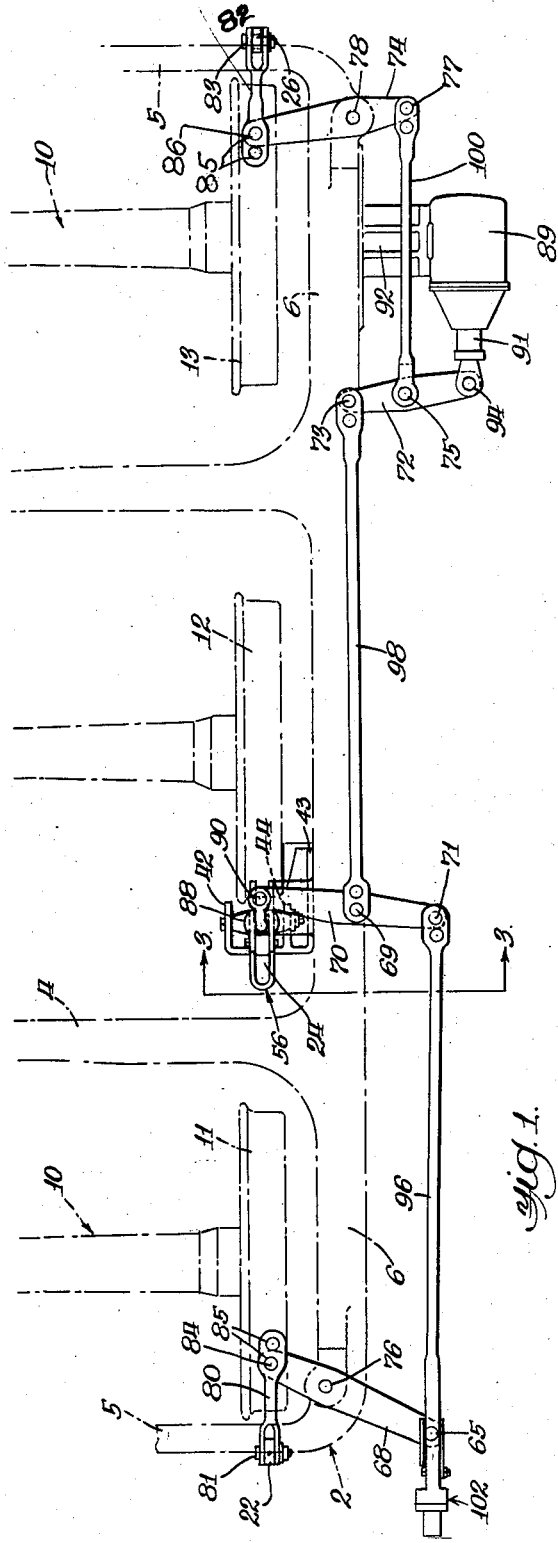
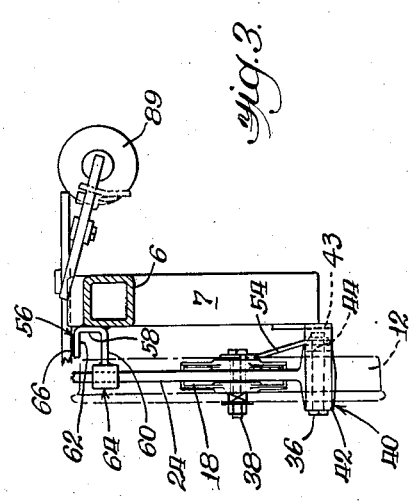
INVENTOR.
Walter R. Polanin
BY
Walter L. Schlegel, Jr. Atty.

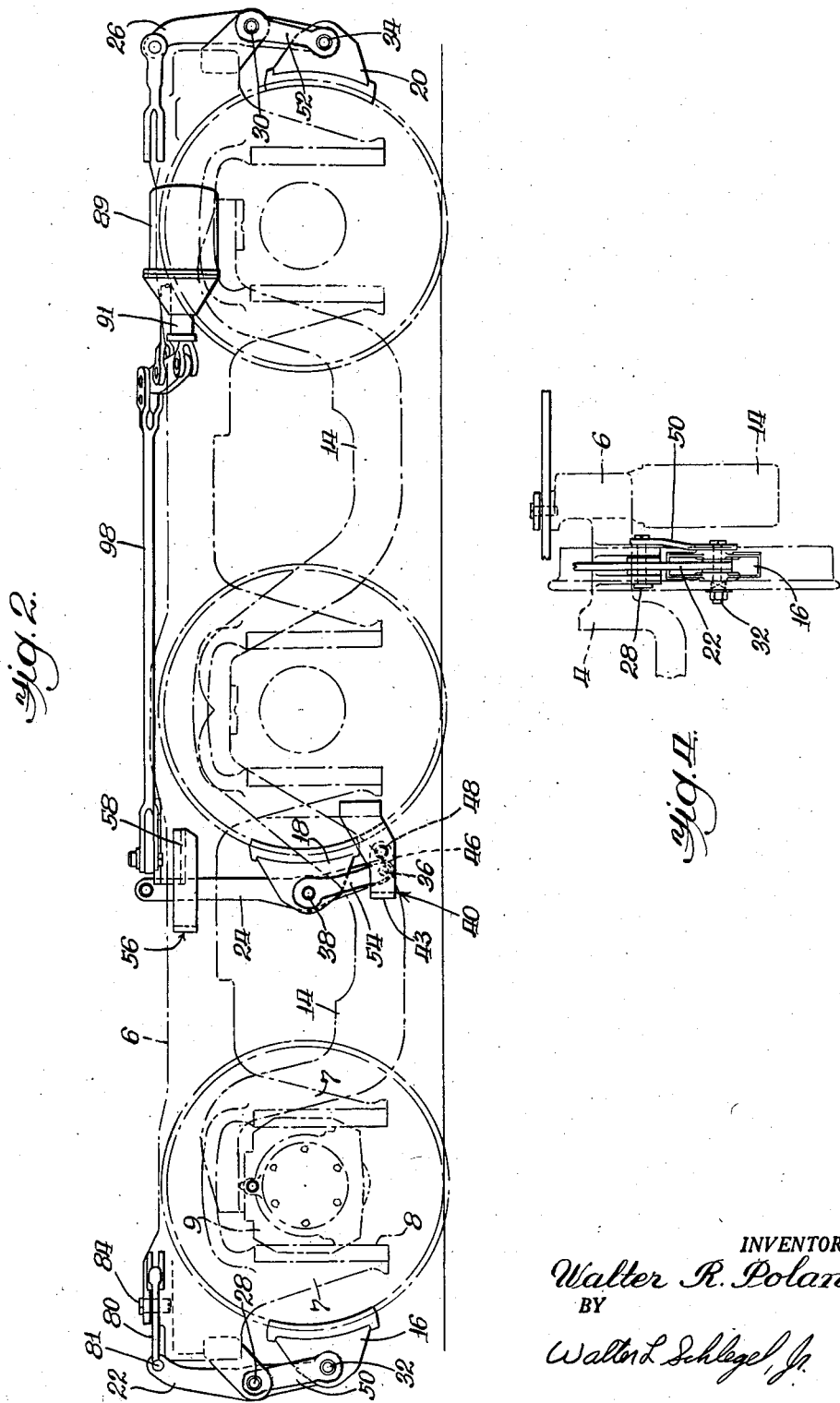

United States Patent Office 2,844,222
Patented July 22, 1958

2,844,222

RAILWAY BRAKE

Walter R. Polanin, Chicago, Ill., assignor to American Steel Foundries, Chicago, Ill., a corporation of New Jersey Application October 6, 1954, Serial No. 460,639

10 Claims. (Cl. 188—46)

This invention relates to rigging for railway car trucks and more particularly to a brake arrangement for a six-wheel type railway truck.

Because of the growing practice of combining a wheel tread type brake arrangement with a rotor type brake arrangement in railway car trucks to obtain maximum braking effect, the need has arisen for a brake arrangement of the tread type that is both simple and efficient, and that requires but a limited amount of space within the truck.

Therefore, a primary object of the invention is to provide a tread brake arrangement that can be utilized either alone or in combination with a rotor brake arrangement.

Another object of the invention is the provision of a simple and efficient brake linkage requiring a limited amount of space in a railway car truck.

Still another object of the invention is to provide a general brake arrangement that can be used in either a four-wheel type or a six-wheel type truck.

These and other objects of the invention will become apparent from the following description and examination of the drawings, wherein:

Figure 1 is a fragmentary top plan view of a railway car truck embodying the invention, only one half of the truck being shown inasmuch as the opposite side of the arrangement of the truck is similar to the arrangement shown, Figure 2 is a fragmentary side elevational view of the structure shown in Figure 1, Figure 3 is a fragmentary sectional view taken along line 3—3 of Figure 1, and Figure 4 is a fragmentary end elevational view of the structure shown in Figure 2, as seen from the left.

It will be noted that for the purposes of clarity, some details have been omitted from some of the views where those details are more clearly illustrated in other views.

Describing the structure in detail, the truck frame of conventional design, designated generally at 2, comprises transoms 4 and end rails 5 preferably formed integral with side members 6, said side members having the usual pedestals 7 forming therebetween journal openings 8 for association in the usual manner with journal boxes 9, said truck frame being supported (not shown) from the journal ends of the wheel and axle assemblies 10 through equalizers 14 having a formation now in conventional use for purposes known to those skilled in the art.

Disposed adjacent wheels 11, 12 and 13 and engageable therewith, are brake shoe assemblies 16, 18 and 20 which are carried by vertical dead brake levers 22, 24 and 26 respectively, the brake levers 22 and 26 being fulcrumed intermediate their respective ends to the frame and movably connected at their lower ends to brake shoe assemblies 16 and 20 at pivots 32 and 34. The brake lever 24, being fulcrumed at its lower end to the frame at pivotal connection 36, is movably connected, intermediate its ends, to the brake shoe assembly 18 at connection 38. The connection between the brake lever 24 and the frame is preferably achieved by means of a wide jawed slack adjusting bracket 40, which is secured to the frame and which comprises arms 42, 43 and 44. The arms 42 and 44 have a plurality of coaxially aligned holes, preferably two, designated 46 and 48, which are adapted to receive pivot 36 in various positions to accommodate the adjustment for slack in the linkage.

Brake shoe assemblies 16 and 20 may be additionally supported from the frame by brake hangers 50 and 52, respectively, the former hanger having its ends connected to pivots 28 and 32 and the latter having its ends connected to pivots 30 and 34. Brake shoe assembly 18 is additionally supported from the frame by brake hanger 54, said brake hanger having its ends connected to the pivots 36 and 38.

Because of the length of the brake lever 24, an additional support or guide bracket 56 may be utilized, said bracket being generally U-shaped as seen in Figure 3 having a vertical element 58 secured to the side member of the frame and spaced horizontal arms 60 and 62 integral with said element and extending inboardly therefrom. The lower arm 60 has at the inboard end thereof a U-shaped guide slot 64, in which is guided the brake arm 24. The upper arm 62 of the element, also extending inboardly, has on it a pad 66 which serves as a horizontal support for the live actuating lever 70 hereinafter described.

Four actuating levers 68, 70, 72 and 74 are operatively carried by the frame. The actuating levers 68 and 74, being disposed adjacent the wheels 11 and 13, respectively, are dead brake levers, being fulcrumed to the frame at pivots 76 and 78, said levers being connected at their inboard ends to certain ends of compression rods 80 and 82, respectively, at pivotal connections 84 and 86. The compression rods 80 and 82, each preferably being bifurcated at one end to receive the upper end of related brake levers and being bifurcated at the other end and having a plurality of holes 85 thereat to adjustably receive the inboard ends of the actuating levers.

The actuating lever 70 is a floating lever having at its inboard end a connection 90 with a link or clevis 88, said clevis being connected to the brake lever 24.

A power cylinder 89 having a piston rod 91 is secured to mounting bracket 92, said bracket 92 being positioned on the frame preferably at one corner thereof.

The outboard end of the actuating lever 72 is operatively connected to the cylinder piston rod 91 at point 94.

The actuating levers 68, 70, 72 and 74 are connected by pull rods 96, 98 and 100, the pull rod 96 being connected at one end to the outboard end of the actuating lever 68 at pivot 65 and at the other end to the outboard end of actuating lever 70 at pivot 71, the pull rod 98 being connected at one end to the actuating lever 70 at pivot 69 intermediate the ends of said actuating lever 70 and at the other end to the inboard end of the actuating lever 72 at pivot 73, and the pull rod 100 being connected at one end to the actuating lever 72 at pivot 75 intermediate the ends of said actuating lever 72 and at the other end to the outboard end of the actuating lever 74 at pivot 77.

The structure may additionally comprise a conventional slack adjusting device 102 preferably positioned within the arrangement at the pivotal connection 65 between the pull rod 96 and the actuating lever 68.

To describe the operation of the structure as the cylinder 89 is energized, the piston rod 91 moves the actuating lever 72 causing it to rotate about the pivot 73 in a clockwise direction (as seen in Figure 1), thereby moving the pull rod 100 to the left, thereby rotating the actuating lever 74 about the pivot 78 in a clockwise direction, thereby actuating the brake lever 26 through the rod 82 in a clockwise direction (as seen in Figure 2)

about the pivot 30 until the brake shoe assembly 20 is brought into engagement with the wheel 13.

At this time, the actuating lever 72 rotates about the pivot 75 in a clockwise direction (as seen in Figure 1), thereby moving the pull rod 98 to the right, thereby rotating the actuating lever 70 about the pivot 71 in clockwise direction, thereby actuating the brake lever 24 about the pivot 36 (as seen in Figure 2) in a clockwise direction until the brake shoe assembly 18 is brought into engagement with the wheel 12.

At this time, the actuating lever 70 rotates about the pivot 90 (as seen in Figure 1) in a counterclockwise direction, thereby moving the pull rod 96 to the right, thereby rotating the actuating lever 68 about the pivot 76 in a counterclockwise direction, thereby actuating the brake lever 22 through the compression rod 80 in a counterclockwise direction (as seen in Figure 2) about the pivot 28 and the brake shoe assembly 16 is brought into engagement with the wheel 11.

The plurality of holes 48 in the bracket 40 provide for slack adjustment in the linkage in lieu of, and in addition to, a slack adjustment device which may be disposed in the linkage.

It will be noted that the arms 42 and 44 of slack adjusting bracket 40 are spaced from each other a distance greater than the width of the related wheel 12 in order to facilitate the insertion of the wheel from the truck.

I claim:

1. In a single shoe brake arrangement for a railway car truck comprising a frame supported by three wheel and axle assemblies spaced from each other, said assemblies including a center and two end wheels on each side of the truck, the combination of: a friction assembly positioned adjacent and engageable with each of the wheels on one side of the truck, two of said friction assemblies being disposed on the same side of their respective wheels and one of said friction assemblies being disposed in the opposite side of its respective wheel, a dead brake lever pivoted to each friction assembly and fulcrumed to the frame, a power cylinder mounted on the frame adjacent one of said end wheels, the brake levers associated with the end wheels being disposed outwardly thereof, a pair of dead actuating levers fulcrumed intermediate their ends to the frame adjacent the end wheels, the inboard ends of said actuating levers being operatively connected to the upper ends of the brake levers associated with the end wheels, a floating actuating lever having its inboard end operatively connected to the upper end of the center brake lever, a floating cylinder lever having its outboard end operatively connected to the power cylinder, a pull rod interconnecting the outboard end of one dead actuating lever with the outboard end of the floting actuating lever, another pull rod interconnecting a medial portion of the floating actuating lever with the inboard end of the cylinder lever, and a third pull rod interconnecting a medial portion of the cylinder lever, with the outboard end of the other dead actuating lever.

2. A brake arrangement according to clim 1, wherein the operating connection between the dead actuating levers and their respective brake levers comprises compression rod means.

3. In a single shoe brake arrangement for a railway car truck having a frame supported by three wheel and axle assemblies including center and end wheels, spaced from each other, the combination of: friction assemblies disposed adjacent and engageable with each of the wheels on one side of the truck, dead brake levers fulcrumed to the frame and pivoted to each friction assembly, the friction assemblies and brake levers associated with the end wheels being disposed outwardly thereof, a pair of dead actuating levers fulcrumed intermediate their ends to the frame and having their inboard ends operatively connected to the end dead brake levers, a floating actuating lever having its inboard end operatively connected to the center brake lever, a power cylinder mounted on the frame, a floating cylinder lever having its outboard end operatively connected to the power cylinder, a pull rod interconnecting the outboard ends of one dead actuating lever and the floating actuating lever, another pull rod connecting the outboard end of the other dead actuating lever and a medial portion of the cylinder lever, and a third pull rod connecting the inboard end of the cylinder lever and a medial portion of the floating actuating lever, said pull rods being disposed above the axles of said wheel and axle assemblies.

4. A brake arrangement according to claim 3, wherein the pull rods are disposed in substantially parallel relationship to each other.

5. A single shoe brake arrangement for a railway car truck having a frame supported by three wheel and axle assemblies including center and end wheels, comprising in combination: friction means positioned adjacent to and engageable with each wheel on one side of the truck, the friction means associated with the end wheel and axle assemblies being disposed outwardly thereof, dead brake levers fulcrumed to the frame and pivoted to the respective friction means, dead actuating levers fulcrumed to the frame and operatively connected to the end brake levers, a floating actuating lever operatively connected to the center brake lever, power means, a substantially horizontal floating power lever connected to the power means, a pull rod interconnecting the floating actuating lever and floating power lever, and pull rods connecting each floating lever with a dead actuating lever.

6. A brake arrangement according to claim 5, wherein the operative connection between each dead actuating lever and its related brake lever comprises a compression rod.

7. A brake arrangement according to claim 5, wherein the pull rods are disposed substantially parallel to each other.

8. In a single shoe brake arrangement for a six-wheel railway car truck having a truck frame supported by three wheel and axle assemblies, the combination of: power means, a friction shoe assembly engageable with each wheel and axle assembly, three substantially vertical dead levers pivoted to said friction shoe assemblies, two of said vertical levers being fulcrumed intermediate their ends to the frame and pivoted to their related friction shoe assemblies at their lower ends, and one of said vertical levers being fulcrumed at its lower end to the frame and pivoted intermediate its ends to its related friction shoe assembly, four substantially horizontal levers, two of said horizontal levers being dead levers fulcrumed intermediate their ends to the frame, and having at their inboard ends operative connections with said two dead vertical levers, one of said horizontal levers being a live lever having at its inboard end an operative connection with the third of said vertical levers, another of said horizontal levers being a live lever having at its outboard end an operative connection with the power means, and three pull rods, one of said pull rods connecting the respective outboard ends of one of the dead horizontal levers and the first mentioned live horizontal lever, another of said pull rods connecting the said first mentioned live horizontal lever intermediate its ends to the inboard end of the other live horizontal lever, and another of said pull rods connecting said other live horizontal lever intermediate its ends to the outboard end of the other dead horizontal lever.

9. A brake arrangement according to claim 8, and including a frame mounted bracket comprising arms spaced from each other so as to permit the insertion of a wheel therebetween having a plurality of coaxially aligned openings, said arms being pivotally connected to one of said vertical levers at a plurality of positions by means of said openings.

10. A brake arrangement according to claim 9, and including a frame mounted bracket, said bracket having a plurality of arms, one of said arms serving to guide one of said vertical levers, and the other of said arms serving to support one of said live horizontal levers.

References Cited in the file of this patent

UNITED STATES PATENTS

| Number | Name | Date |
|---|---|---|
| 1,415,730 | Taylor | May 9, 1922 |
| 1,598,685 | Kiesel | Sept. 6, 1926 |
| 1,735,055 | Priebe | Nov. 12, 1929 |
| 2,237,509 | Tack | Apr. 8, 1941 |
| 2,402,389 | Gantner | June 18, 1946 |
| 2,754,935 | Tack et al. | July 17, 1956 |